(12) United States Patent
Inoue et al.

(10) Patent No.: US 6,458,307 B2
(45) Date of Patent: *Oct. 1, 2002

(54) METHOD OF MANUFACTURING A GOLF BALL

(75) Inventors: Michio Inoue; Keisuke Ihara; Hirotaka Shimosaka; Yutaka Masutani; Atsuki Kasashima, all of Saitama (JP)

(73) Assignee: Bridgestone Sports Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,074
(22) PCT Filed: Dec. 24, 1997
(86) PCT No.: PCT/JP97/04801
§ 371 (c)(1),
(2), (4) Date: Jan. 29, 1999
(87) PCT Pub. No.: WO98/28048
PCT Pub. Date: Jul. 2, 1998

(30) Foreign Application Priority Data

Dec. 24, 1996 (JP) .............................................. 8-343188

(51) Int. Cl.[7] ......................... B29C 43/18; B29C 45/14
(52) U.S. Cl. ...................... 264/232; 264/248; 264/250; 264/255; 264/279.1; 264/340
(58) Field of Search ................................. 264/232, 340, 264/279.1, 248, 129, 254, 250, 255; 473/376, 377, 378

(56) References Cited

U.S. PATENT DOCUMENTS

| | | | | |
|---|---|---|---|---|
| 4,123,061 A | * | 10/1978 | Dusbiber | 273/220 |
| 5,334,673 A | * | 8/1994 | Wu | 273/235 R |
| 5,459,220 A | * | 10/1995 | Kennedy | 528/44 |
| 5,484,870 A | | 1/1996 | Wu | |
| 5,692,974 A | * | 12/1997 | Wu et al. | 473/377 |

FOREIGN PATENT DOCUMENTS

| | | | |
|---|---|---|---|
| JP | 75010358 B | * | 4/1975 |
| JP | 4-241881 | | 8/1992 |
| JP | 7-145222 | | 6/1995 |
| JP | 8-47553 | | 2/1996 |
| WO | WO 92/19656 | * | 11/1992 |

* cited by examiner

*Primary Examiner*—Jan H. Silbaugh
*Assistant Examiner*—Edmund H. Lee
(74) *Attorney, Agent, or Firm*—Sughrue Mion, PLLC

(57) ABSTRACT

A method of manufacturing a golf ball is disclosed. A cover is molded through use of either a thermoplastic resin having a group capable of reacting with an isocyanate group or a thermoplastic resin containing a compound having two or more groups capable of reacting with an isocyanate group. Subsequently, a polyisocyanate compound is caused to permeate into the surface layer of the cover to thereby cause the reaction between the polyisocyanate compound and the group(s) capable of reacting with the isocyanate group. As a result, a modified layer having excellent properties is formed at the surface of the cover formed from thermoplastic resin. In this case, a non-yellowing polyurethane resin is preferably used as the thermoplastic resin having a group capable of reacting with an isocyanate group, and 4,4-diphenylmethane diisocyanate (MDI) is preferably used as the polyisocyanate compound.

9 Claims, 1 Drawing Sheet

METHOD OF MANUFACTURING A GOLF BALL

TECHNICAL FIELD

The present invention relates to a method of manufacturing a golf ball having a cover formed from a thermoplastic resin, and particularly to a method of manufacturing a golf ball in which the surface layer of a cover formed from a thermoplastic resin is modified to impart excellent characteristics to the cover.

BACKGROUND ART

Solid golf balls such as two-piece golf balls and thread-wound golf balls are usually manufactured by the steps of enclosing a solid core or thread-wound core with a cover by compression molding or injection molding, forming dimples in the cover, and stamping markings on and applying a coating onto the surface of the cover. In this manufacturing process, thermoplastic resins such as ionomer resins, polyolefin resins, and polyurethane resins are often used as materials for covers.

When thermoplastic resins are used as materials for covers of golf balls, covers and dimples in covers can be readily formed by compression molding or injection molding. However, covers formed from thermoplastic resins may be unsatisfactory in heat resistance, wear resistance, compression resistance, solvent resistance, chemical resistance, or like physical properties. Also, imparting a certain performance to a cover is impossible unless a thermoplastic resin used can impart the property to the cover.

By contrast, use of thermosetting resins as materials for covers of golf balls enables an improvement of physical properties of covers and can impart to covers performance which thermoplastic resins cannot. However, use of thermosetting resins as cover materials limits the method of molding to compression molding and involves difficulty in setting molding conditions. As a result, the formation of covers and dimples becomes difficult to carry out.

In recent years, in order to meet the demand for improved resilience, spin properties, and feel on impact, covers have employed a multilayered structure consisting of a plurality of layers having different physical properties, i.e. multi-piece covers have been employed. However, even in the case of using either thermoplastic resins or thermosetting resins as materials for covers, constituent layers of a multilayered cover are difficult to be uniformly formed to a thickness of not greater than 1 mm. Consequently, the thickness of each layer or the overall thickness of a cover becomes relatively thick, resulting in a failure to obtain desired performance.

In view of the foregoing, an object of the present invention is to provide a method of manufacturing golf balls capable of improving physical properties of the cover of a golf ball, imparting to the cover performance which cannot be imparted by thermoplastic resins alone, and reducing the thickness of each layer of a multilayered cover or the overall thickness of the cover, by modifying the surface layer of a cover formed from an easy-to-mold thermoplastic resin.

DISCLOSURE OF THE INVENTION

To achieve the above object, the present invention provides a method of manufacturing golf balls, comprising the steps of: molding a cover through use of either a thermoplastic resin having a group capable of reacting with an isocyanate group or a thermoplastic resin containing a compound having two or more groups capable of reacting with an isocyanate group; and causing a polyisocyanate compound to permeate into the surface layer of the cover to thereby induce the reaction between the polyisocyanate compound and the group(s) capable of reacting with the isocyanate group, whereby a modified layer is formed at the surface of the cover.

According to the method of the present invention, a cover is molded from either a thermoplastic resin having a group (a reactive group) capable of reacting with an isocyanate group or a thermoplastic resin containing a compound (a reactive compound) having two or more reactive groups. Subsequently, a polyisocyanate compound is caused to permeate into the surface layer of the cover to thereby cause the reaction between the polyisocyanate compound and the reactive group(s) contained in the thermoplastic resin, causing a number of urethane linkages and urea linkages, i.e. a bridge structure. Thus is a modified surface layer. Through appropriate selection of the above thermoplastic resin, reactive groups, reactive compound, and polyisocyanate compound, desired physical properties can be imparted to the surface layer of a cover.

In the present invention, a golf ball is manufactured according to, for example, the procedure shown in FIGS. 1A and 1B. First, as shown in FIG. 1A, a solid core 2 formed from polybutadiene rubber or the like is enclosed with a single-layer cover 4 through injection molding or a like molding of a thermoplastic resin. Next, as shown in FIG. 1B, a polyisocyanate compound is caused to permeate into the surface layer of the cover 4 to thereby cause the reaction between the penetrating polyisocyanate compound and a reactive group contained in the thermoplastic resin of the cover 4, whereby the surface layer is modified to obtain a modified layer 6.

BRIEF DESCRIPTION OF DRAWINGS

Sectional views showing an example of the steps of a method of manufacturing a golf ball according to the present invention.

BEST MODE FOR CARRYING OUT THE INVENTION

Figure 1A:
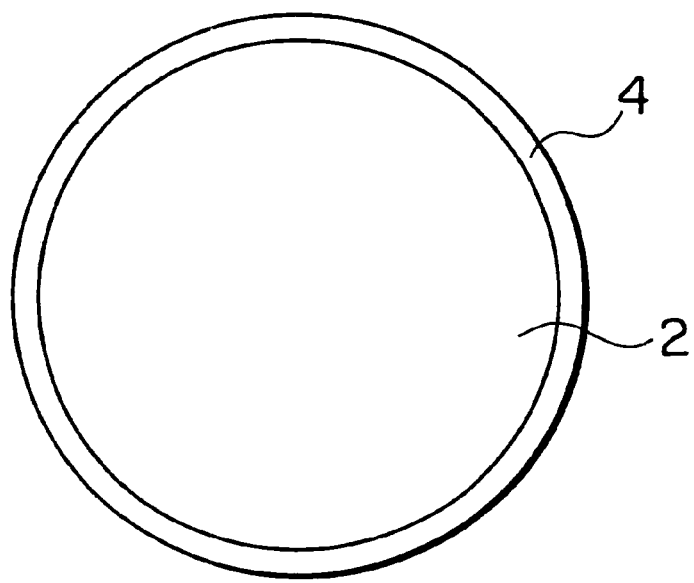
Figure 1B:
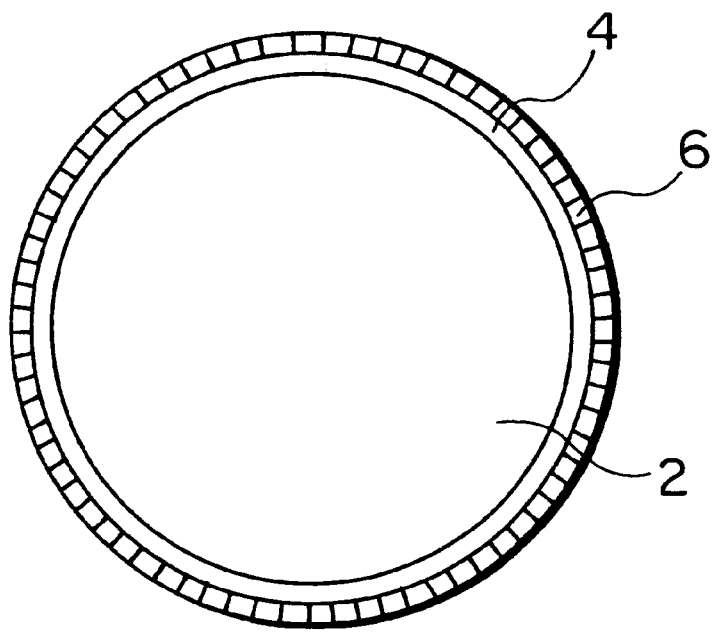

Examples of thermoplastic resins usable as materials for the cover of a golf ball in the present invention include the following three types.

(1) A thermoplastic resin having a group capable of reacting with an isocyanate group (a reactive thermoplastic resin).
(2) A thermoplastic resin having no group capable of reacting with an isocyanate group (a nonreactive thermoplastic resin) mixed with a reactive compound.
(3) A reactive thermoplastic resin mixed with a reactive compound.

A reactive thermoplastic resin may be any thermoplastic resin which contains in its structure a group capable of reacting with an isocyanate group, for example, a group having active hydrogen such as hydroxyl group, carboxyl group, amino group, urethane linkage, and urea linkage. Examples of a thermoplastic resin having such a group include polyurethane resins, polyamide resins, polyester resins, acrylic resins, and cellulose resins. A number of reactive groups may be introduced, as needed, into these thermoplastic resins in manufacture thereof through copolymerization with comonomers having a group capable of reacting with an isocyanate group.

Also, thermoplastic resins having no reactive group can be converted to reactive thermoplastic resins in manufacture thereof through copolymerization with monomers having a reactive group. Examples of such nonreactive thermoplastic resins include polyolefin resins such as polyethylene and polypropylene, polystyrene resins, polyvinyl chloride resins, AS and ABS resins, vinyl acetate resins, polycarbonate resins, and acetylcellulose resins.

For the aforementioned thermoplastic resins having no reactivity (nonreactive thermoplastic resins), the method of the present invention can be carried out by adding thereto a compound having two or more groups capable of reacting with an isocyanate group, i.e. two or more groups having active hydrogen. Examples of such a reactive compound include: the aforementioned reactive thermoplastic resins; low molecular weight compounds such as polyol, polyamine, and polycarboxylic acid; and oligomers such as polyester-polyol, polyether-polyol, and polyester-polycarboxylic acid.

Examples of preferred low molecular weight reactive compounds include: low molecular weight polyol compounds such as ethylene glycol, 1,4-butanediol, 1,6-hexanediol, 1,5-naphthylene-di-β-dihydroxyethyl ether, hydroquinone-β-dihydroxyethyl ether, trimethylolpropane, glycerin, and hexanetriol; low molecular weight polyamines such as ethylenediamine, propylenediamine, butylenediamine, hexamethylenediamine, 3,3'-dichlorobenzidine, 3,3'-dichloro-4,4'-diaminodiphenylmethane, and 2,5-dichlorophenyl-1,4-diamine; low molecular weight amino-alcohols such as amino-ethyl alcohol, 3-amino-chlorohexanol, and p-aminophenyl-ethyl alcohol; low molecular weight aliphatic polycarboxylic acids such as oxalic acid, malonic acid, succinic acid, glutaric acid, adipic acid, pimelic acid, fumaric acid, maleic acid, methylmaleic acid, methylfumaric acid, itaconic acid, citraconic acid, mesaconic acid, acetylenic acid, malic acid, methylmalic acid, citric acid, isocitric acid, and tartaric acid; and aromatic polycarboxylic acids such as phthalic acid, terephthalic acid, isophthalic acid, trimellitic acid, 1,2,3-benzenetricarboxylic acid, 1,3,5-benzenetricarboxylic acid, pyromellitic acid, benzenehexacarboxylic acid, naphthalenedicarboxylic acid, naphthalenetricarboxylic acid, naphthalenetetracarboxylic acid, diphenyltetracarboxylic acid, diphenyl ether tetracarboxylic acid, and azobenzenetetracarboxylic acid.

Examples of reactive compounds include: the aforementioned polyester polyol and polyester polycarboxylic acid, each formed from polyol and polycarboxylic acid; polyamide amine and polyamide carboxylic acid, each formed from polyamine and polycarboxylic acid; and the aforementioned polyether polyol which is formed by polymerizing alkylene oxide such as ethylene oxide or propylene oxide with polyol or polyamine used as a polymerization initiator.

Reactive compounds used in the present invention are not limited to the aforementioned low molecular weight compounds and oligomers, but may be polymers such as polyurethane resins, polyamide resins, polyester resins, acrylic resins, melamine resins, urea resins, phenolic resins, and alkyd resins.

A reactive compound as mentioned above may be mixed with a thermoplastic resin before the resin is molded into a cover, or may be caused to permeate into a molded cover. In view of time required for penetration and the fact that some reactive compounds are difficult to permeate, a reactive compound is preferably mixed with a thermoplastic resin before the resin is molded into a cover.

When a reactive compound is mixed with a nonreactive thermoplastic resin, the reactive compound is mixed in a concentration of 0.0001 mol to 1 mol based on a reactive group for 100 g of the thermoplastic resin. When a reactive compound is contained in a concentration of less than 0.0001 mol, the cross linking density attained by a polyisocyanate compound becomes relatively low. As a result, an object of the present invention is not sufficiently achieved. By contrast, a concentration in excess of 1 mol is uneconomic and may impair physical properties which a cover must have.

A polyisocyanate compound used in the present invention is a compound having two or more isocyanate groups. Any polyisocyanate compounds which have conventionally been used in the art related to polyurethane resins may be used in the present invention. Examples of such polyisocyanate compounds include: aromatic diisocyanates such as 2,4-tolylene diisocyanate and 2,6-tolylene diisocyanate and the mixture thereof, 4.4-diphenylmethane diisocyanate (MDI), m-phenylene diisocyanate, and 4,4'-biphenyl diisocyanate; aliphatic diisocyanates such as tetramethylene diisocyanate, hexamethylene diisocyanate (HDI), and octamethylene diisocyanate; aromatic aliphatic diisocyanates such as xylene diisocyanate; and triisocyanates such as 4,4', 4"-triphenylmethane triisocyanate, 2,4,4'-biphenyl triisocyanate, and 2,4,4'-diphenylmethane triisocyanate.

Other polyisocyanate compounds usable in the present invention include adducts or isocyanate polymers, each having two or more isocyanate groups and obtained by the reaction between any of the aforementioned diisocyanates or triisocyanates and a compound having two or more hydroxyl groups such as diol or triol. These polyisocyanate compounds may be used singly or in combination.

Preferred examples of the polyisocyanate compound usable in the present invention include aromatic diisocyanates, among which MDI is particularly preferred. Aromatic diisocyanates, particularly MDI, have high reactivity with a reactive group in a thermoplastic resin. Therefore, if aromatic diisocyanate, particularly MDI, is used as the polyisocyanate compound, the effect of the present invention is satisfactorily obtained. By contrast, aliphatic polyisocyanate such as HDI has low reactivity with a reactive group contained in a thermoplastic resin, and slowly reacts with the reactive group, although it is usable in the present invention. Therefore, if aliphatic polyisocyanate is used as the polyisocyanate compound, the effect of the present invention may not be satisfactorily obtained.

In the method of manufacturing golf balls according to the present invention, a cover is molded from a thermoplastic resin as mentioned previously. Subsequently, a polyisocyanate compound is caused to permeate into the surface layer of the cover to thereby cause the reaction between the polyisocyanate compound and a reactive group(s) contained in the thermoplastic resin, thereby modifying the surface layer. Thereafter, the surface of the cover is stamped with markings and coated appropriately, as needed, to thereby obtain a product golf ball.

In this case, preferred thermoplastic resins are ionomer resins, polyolefin resins, polyurethane resins, polyamide resins, and mixtures thereof, among which polyurethane resins are particularly preferred. Among polyurethane resins, non-yellowing polyurethane resins generally have low glass transition temperatures, resulting in excellent resilience. Further, non-yellowing polyurethane resins prevent the discoloration of a cover with time and maintain the white color of the golf ball for a longer period. Non-yellowing polyurethane resins mean polyurethane resins containing polyisocyanate other than aromatic polyisocyanate. Particularly preferred non-yellowing polyurethane resins usable in the present invention are polyurethane resins containing aliphatic polyisocyanate such as tetramethylene diisocyanate, HDI, 2,4,4-(2,4,4)-trimethylhexamethylene diisocyanate, octamethylene diisocyanate, lysine diisocyanate, or like polyisocyanate, since they impart excellent resilience and increased travel distance. The term "polyurethane resins" encompasses polyurethane elastomers. In the present invention, non-yellowing polyurethane elastomers, particularly polyurethane elastomers containing aliphatic polyisocyanate, are most advantageously used, since these elastomers have excellent resilience and therefore increase travel distance, while effectively preventing discoloration of a cover with time. When these thermoplastic resins are used as materials for covers, preferred polyisocyanate compounds usable therewith are 2,4-tolylene diisocyanate and MDI, especially MDI, in light of high reactivity with a reactive group contained in a thermoplastic resin. Therefore, in the present invention, the most preferable result is attained through use of a non-yellowing polyurethane elastomer as the thermoplastic resin and MDI as the polyisocyanate compound.

A cover is molded by the injection molding method wherein a thermoplastic resin is directly injection-molded onto a solid core or thread-wound core or by the compression molding method wherein semispheric cover materials (half cups) of a thermoplastic resin are put on a solid core or thread-wound core and then compression-molded. However, the molding method is not limited thereto. Dimples may be formed at the same time that or after a cover is molded.

Examples of a method of causing a polyisocyanate compound to permeate into the surface layer of a cover include the following methods: (1) a polyisocyanate compound is heated to obtain a molten liquid thereof; (2) a polyisocyanate compound is dissolved in an appropriate organic solvent to obtain a solution thereof; and (3) a polyisocyanate compound is gasified through application of heat to obtain a gas thereof. These methods particularly prefer relatively low molecular weight polyisocyanate compounds. In the methods (1) and (2), a golf ball having a molded cover is immersed in a polyisocyanate compound liquid or solution, or the liquid or solution is applied onto the cover surface. In the method (3), a golf ball having a molded cover is placed in a polyisocyanate compound gas. In order to accelerate penetration of a polyisocyanate compound, a polyisocyanate compound in the form of either liquid or gas may be caused to permeate under pressure, or a liquid or gas of a polyisocyanate compound may be heated to such a temperature as not to impair a cover, for example, a temperature of 50° C. to 200° C.

A polyisocyanate compound is caused to permeate into a cover formed from a thermoplastic resin preferably in a density of 0.1 to 70 parts by weight in 100 parts by weight of the portion of the cover permeated with the polyisocyanate compound. If the density is less than 0.1 parts by weight, a required cross linking density will not be achieved. By contrast, if the density is in excess of 70 parts by weight, the cross linking density will become excessively high, and an unreacted polyisocyanate compound will remain in a cover. The amount of penetration of a polyisocyanate compound can be altered as needed in accordance with a required cross linking density or a reactive group existing in or a reactive compound contained in a thermoplastic resin.

The reaction between a polyisocyanate compound, which has permeated into the surface layer of a cover as described above, and a reactive group contained in a thermoplastic resin proceeds over long hours even at room temperature. Thus, heating is not a mandatory condition for the reaction. However, in general, a golf ball whose cover has been permeated with a polyisocyanate compound is preferably heated at an appropriate temperature of 50° C. to 200° C. for several minutes through several hours so as to accelerate a reaction of an isocyanate group, i.e. a cross linking reaction.

In the present invention, the thickness of a cover before modification is preferably 1.0 mm to 3.0 mm, particularly preferably 1.5 mm to 2.5 mm; and the thickness of a modified layer is preferably 0.1 mm to 1.0 mm, particularly preferably 0.2 mm to 0.8 mm. As mentioned previously, conventionally, constituent layers of a multilayered cover are difficult to be uniformly formed to a thickness of not greater than 1 mm. Consequently, the thickness of each layer or the overall thickness of a cover becomes relatively thick, resulting in a failure to obtain the desired performance. By contrast, by forming a modified layer having a thickness of the above range in a cover having a thickness of the above range, the following advantages (a) to (d) are obtained. The thickness of a modified layer is substantially identical to the depth of penetration of a polyisocyanate compound into the surface layer of a cover (the thickness of the portion of the cover permeated with the polyisocianate compound).

(a) A cover can assume a multilayered structure consisting of a plurality of layers which are different in a physical property, while the entire thickness of the cover is maintained at 1.0 mm to 3.0 mm. Accordingly, a multilayered cover is formed such that the thickness of each layer and the entire thickness thereof are thin, and thus desired performance can be obtained.

(b) According to the aforementioned penetration methods (1) to (3), a polyisocyanate compound permeates into the surface layer of a cover to a uniform thickness. Thus is obtained a golf ball whose cover is composed of layers having uniform thicknesses and which has excellent symmetricalness.

(c) Constituent layers of a conventional multilayered cover are molded separately from each other, and thus the layers are not integrated together. This multilayered structure involves a potential separation of layers from each other or a potential failure in proper transmission of a force applied to a ball from an outer layer to an inner layer when the ball is hit, resulting in a potential deterioration in the durability of a cover and ball performance. By contrast, the aforementioned methods (1) to (3) provide a multilayered cover composed of integrated layers. Thus, when a ball is hit, no separation of one layer from the other occurs, and a force applied to the ball is properly transmitted from an outer layer to an inner layer, resulting in an improvement in the durability of a cover and ball performance.

(d) The performance of a cover can be altered by changing the hardness of the surface layer of the cover through the aforementioned modification. For example, when modification is carried out such that the hardness of a surface layer becomes higher than that of an inner layer, the obtained multilayer cover provides improved durability and reduced spin motion as compared with a cover whose surface layer is not modified. Thus, even a material which is said to be unsuitable for a cover of a golf ball due to poor durability can be used as a material for a cover. In this case, the hardness of a cover before modification is preferably 40 to 60 on the Shore D scale, particularly preferably 45 to 55; and the hardness of a modified layer is preferably 60 to 70 con the Shore D scale, particularly preferably 65 to 70. By contrast, when modification is carried out such that the hardness of a surface layer becomes lower than that of an inner layer, the multilayer cover thus obtained provides higher spinability as compared with a cover whose surface layer is not modified, while a reduction in resilience is minimized. In this case, the hardness of a cover before modification is preferably 60 to 70 on the Shore D scale, particularly preferably 65 to 70; and the hardness of a modified layer is preferably 40 to 60 on the Shore D scale, particularly preferably 45 to 55. In the latter case, the difference in hardness (Shore D) between the modified layer and the unmodified inner layer is preferably 5 to 25, particularly preferably 10 to 25.

EXAMPLES

Two-piece golf balls of Examples 1 and 2 and Comparative Examples 1–3 shown in Table 2 were manufactured by selectively using cores having composition A or B shown in Table 1 and by covering the cores with covers having the following compositions- In Examples 1 and 2, each golf ball was immersed in molten liquid of a polyisocyanate compound for a predetermined time, and then heated at a predetermined temperature (cure temperature) for a predetermined time (cure time), whereby the cover of the golf ball was modified. The conditions of the modification are shown in Table 2. The covers of Comparative Examples 1–3 were not modified.

In Table 1, BR01 (product of Japan Synthetic Rubber Co., Ltd.) was used as polybutadiene rubber, and Percumyl D (product of NOF Corp.) was used as dicumyl peroxide. The specific gravity, hardness, and initial speed of the cores of Compositions A and B are shown in Table 1. The hardness shown in Table 1 represents a deformation of a core under a load of 100 kg. The initial speed shown in Table 1 represents the initial speed of a core as measured when hit by a No.1 Wood at a head speed of 45 m/s through use of a hit testing machine.

(Cover Composition: Polyurethane)

A cover was formed exclusively of a non-yellowing thermoplastic polyurethane elastomer containing aliphatic diisocyanate. The surface hardness of the cover of this composition was 48 on the Shore D scale.

(Cover Composition: Ionomer a)

A cover was formed of a mixture of Surlyn 8120 product of Du Pont), Hi-milan 1706 (product of Du Pont-Mitsui Polychemicals Co., Ltd.), and Hi-milan AM7316 (product of Du Pont-Mitsui Polychemicals Co., Ltd.) (mixing ratio of 50:25:25 (by weight)). The surface hardness of the cover of this composition was 48 on the Shore D scale.

(Cover Composition: Ionomer b)

A cover was formed of a mixture of Hi-milan 1557 (product of Du Pont-Mitsui Polychemicals Co., Ltd.) and Hi-milan 1601 (product of Du Pont-Mitsui Polychemicals Co., Ltd.) (mixing ratio of 50:50 (by weight)). The surface hardness of the cover of this composition was 60 on the Shore D scale.

TABLE 1

| Core Composition | Composition (wt. %) | |
| --- | --- | --- |
| | A | B |
| Polybutadiene rubber | 100.0 | 100.0 |
| Zinc acrylate | 21.5 | 21.5 |
| Zinc oxide | 12 | 26.3 |
| Dicumyl peroxide | 1 | 1 |
| Specific gravity | 1.07 | 1.16 |
| Hardness | 3.41 | 3.41 |

TABLE 1-continued

| Core Composition | Composition (wt. %) | |
| --- | --- | --- |
| | A | B |
| Initial speed (m/s) W1:HS45 | 78.12 | 77.28 |

TABLE 2

| | Example | | Comparative Example | | |
| --- | --- | --- | --- | --- | --- |
| | 1 | 2 | 1 | 2 | 3 |
| Core Composition | A | A | B | A | A |
| Cover Composition | Polyurethane | Polyurethane | Ionomer b | Polyurethane | Ionomer a |
| Modification Conditions | | | | | |
| Polyisocyanate Compound | MDI | MDI | — | — | — |
| Temp. of Molten Liquid | 70° C. | 70° C. | — | — | — |
| Immersion Time | 10 min | 20 min | — | — | — |
| Cure Temperature | 80° C. | 80° C. | — | — | — |
| Cure Time | 1 hr | 1 hr | — | — | — |
| Product Golf Ball | | | | | |
| Outer Diameter (mm) | 42.7 | 42.7 | 42.7 | 42.7 | 42.7 |
| Weight (g) | 45.5 | 45.5 | 45.5 | 45.5 | 45.5 |
| Hardness (mm) | 2.9 | 2.8 | 2.5 | 3.1 | 3.1 |
| Cover Hardness (Shore D) | | | | | |
| Outer Surface Hardness | 60 | 60 | 60 | 48 | 48 |
| Inner Surface Hardness | 48 | 52 | 60 | 48 | 48 |
| Travel Distance Test W1:HS50 | | | | | |
| Initial Speed (m/s) W1:HS45 | 77.0 | 77.0 | 77.4 | 77.0 | 77.0 |
| Spin speed (rpm) | 2700 | 2600 | 2500 | 2800 | 2800 |
| Carry Travel Distance (m) | 215 | 216 | 216 | 214 | 214 |
| Total Travel Distance (m) | 226 | 227 | 227 | 224 | 223 |
| Feel on Impact | Good | Good | Bad | Good | Good |
| Degree of Discoloration (ΔY1) | 3.5 | 3.5 | 3.5 | 3.0 | 3.5 |
| Cut Resistance | Good | Good | Good | Bad | Bad |
| Abrasion Resistance Index | Good | Good | Moderate | Bad | Bad |

The golf balls of Examples and Comparative Examples were measured for their cover hardnesses and abrasion resistance, and were subjected to a travel distance test, a feel-on-impact test, a discoloration test, and a cut resistance test, according to the following procedures. The results are shown in Table 2. The hardness of a product golf ball shown in Table 2 represents a deformation of the ball under a load of 100 kg.

(Measurement of Cover Hardness)

A Cover was peeled off each product golf ball, and its outer surface hardness and inner surface hardness were measured.

(Travel Distance Test)

Through use of a hit testing machine, the golf balls were hit by a No. 1 wood at a head speed of 45 m/s. The initial speed, carry travel distance, and total travel distance were measured.

(Feel-on-Impact Test)

The golf balls were subjected to sensory evaluation test for feel on impact in which three professional golfers hit the golf balls with a No. 1 wood and evaluated the feel on impact. The evaluation criteria are as follows:

Good: Feel on impact is good

Bad: Feel on impact is bad (Discoloration)

Each golf ball was subjected to an accelerated discoloration test, and the degree of discoloration of a cover was measured. In this test, through use of an accelerated discoloration testing machine (Type FM-1, product of Suga Testing Machine K.K.), each golf ball was continuously irradiated by means of a mercury lamp for discoloration test (H400-F, product of Toshiba Corp.) for 24 hours, and the yellowness index was measured. The yellowness indexes (YI) before and after irradiation were measured according to the reflection method (JIS-K7103) through use of a multi-light source spectrocolorimeter (Type MSC-1S-2DH, product of Suga Testing Machine K.K.). Based on these measurements, the yellowing degree was calculated in accordance with the following equation. The thus-obtained $\Delta YI$ is shown as the degree of discoloration. If $\Delta YI$ obtained through the equation is greater than zero, the yellowness index has increased; the greater the value of $\Delta YI$, the greater the degree of discoloration.

$\Delta YI = YI - YI_0$ $\Delta YI$: Yellowing degree $YI$: Yellowness index after irradiation $YI_0$: Initial yellowness index of a cover (Cut Resistance)

A no. 9 iron was attached to a hitting robot, and the hitting robot was caused to perform a top-hit shot (shot for hitting the top of a ball) at a head speed of 40 m/s- Subsequently, visual check was performed to evaluate the state of the hit portion of each golf ball. The evaluation criteria are as follows:

Good: A slight dent was observed but no other damage was found on the cover.

Bad: The cover was cut and damage was conspicuous.

(Abrasion Resistance Index)

A pitching wedge was attached to the hitting robot, and the hitting robot was caused to hit each of the golf balls in an ordinary manner at a head speed of 30 m/s. Subsequently, visual check was performed to evaluate damage on the surface of the hit golf ball. The evaluation criteria are as follows:

Good: No abnormality was found on the hit surface.

Moderate: Slight fine splits were found on the hit surface.

Bad: Conspicuous fine splits were found on the hit surface.

As is apparent from Table 2, in the case where a polyisocyanate compound is caused to permeate into the surface layer of a cover formed from a non-yellowing thermoplastic polyurethane elastomer as in Examples 1 and 2, whereby the surface layer is modified so that the hardness thereof becomes greater than that of the inner surface of the cover, when a golf ball is hit with a No 1 wood, the golf ball undergoes a reduced amount of spin and therefore travels a longer distance. In addition, the cut resistance and abrasion resistance of the golf ball are enhanced.

Industrial Applicability

As mentioned previously, according to the method of manufacturing golf balls of the present invention, the surface layer of a cover formed from an easy-to-mold thermoplastic resin is modified, thereby improving physical properties of the cover, imparting to the cover performance which cannot be imparted by the thermoplastic resin alone, and reducing the thickness of each layer of a multilayered cover or the overall thickness of the cover.

What is claimed is:

1. A method of manufacturing a golf ball having a layered cover, comprising the steps of:

molding a cover having thickness of 1.0 to 3.0 mm onto a core through use of either a thermoplastic resin having a group capable of reacting with an isocyanate group or a non-yellowing polyurethane thermoplastic resin containing a compound having two or more groups capable of reacting with an isocyanate group;

causing a polyisocyanate compound to permeate into an outer surface of the cover to thereby cause the reaction between the polyisocyanate compound and the group (s) capable of reacting with the isocyanate group; and forming by the reaction a modified layer modified in hardness having a substantially uniform thickness of 0.2 to 0.8 mm at the outer surface of the cover, wherein the modified layer has a hardness different from the portion of the cover remaining unmodified.

2. A method according to claim 1, wherein said cover is molded to a solid core.

3. A method according to claim 1, wherein said cover is molded to a thread wound core.

4. A method according to claim 1, wherein said non-yellowing polyurethane thermoplastic resin contains polyisocyanate other than aromatic polyisocyanate.

5. A method according to claim 1, wherein said non-yellowing polyurethane contains aliphatic polyisocyanate.

6. A method according to claim 5, wherein said aliphatic polyisocyanate is selected from the group consisting of tetramethylene diisocyanate, HDI, 2,4,4-(2,4,4)-trimethylhexamethylene diisocyanate, octamethylene diisocyanate, and lysine diisocyanate.

7. A method of claim 1, wherein said modified layer of said cover has a Shore D hardness in the range of 60 to 70.

8. A method of claim 1, wherein said modified layer of said cover has a Shore D hardness in the range of 40 to 60.

9. A method according to claim 1, wherein a difference in Shore D hardness between said modified layer of said cover and an unmodified portion of said cover is 5 to 25.

* * * * *